United States Patent
Das et al.

(10) Patent No.: US 10,536,281 B2
(45) Date of Patent: Jan. 14, 2020

(54) MAGNETIC MEMORY PHYSICALLY UNCLONABLE FUNCTIONS

(71) Applicant: UNIVERSITY OF SOUTH FLORIDA, Tampa, FL (US)

(72) Inventors: Jayita Das, Hillsboro, OR (US); Kevin P. Scott, Melbourne, FL (US); Drew H. Burgett, High Springs, FL (US); Srinath Rajaram, Meridian, ID (US); Sanjukta Bhanja, Tampa, FL (US)

(73) Assignee: University of South Florida, Tampa, FL (US)

( * ) Notice: Subject to any disclaimer, the term of this patent is extended or adjusted under 35 U.S.C. 154(b) by 40 days.

(21) Appl. No.: 15/329,601

(22) PCT Filed: May 28, 2015

(86) PCT No.: PCT/US2015/032914
§ 371 (c)(1),
(2) Date: Jan. 27, 2017

(87) PCT Pub. No.: WO2016/018503
PCT Pub. Date: Feb. 4, 2016

(65) Prior Publication Data
US 2017/0214532 A1 Jul. 27, 2017

Related U.S. Application Data

(60) Provisional application No. 62/030,914, filed on Jul. 30, 2014.

(51) Int. Cl.
*H04L 9/06* (2006.01)
*H04L 9/32* (2006.01)
(Continued)

(52) U.S. Cl.
CPC ............ *H04L 9/3278* (2013.01); *G06F 21/73* (2013.01); *G11C 11/15* (2013.01); *G11C 11/161* (2013.01);
(Continued)

(58) Field of Classification Search
CPC ......... H04L 9/3278; H04L 9/06; G11C 11/15; G11C 11/161; G11C 11/1659; G11C 11/1696; G11C 19/0866; H01L 43/08
(Continued)

(56) References Cited

U.S. PATENT DOCUMENTS 6,359,829 B1 * 3/2002 Van Den Berg ........ G11C 11/15
365/173
6,418,046 B1 7/2002 Naji
(Continued)

OTHER PUBLICATIONS

Kurtz, S.; et, al, "Non-majority magnetic logic gates: a review of experiments and future prospects for 'shape-based' logic" Journal of Physics: Condensed Matter, 23 (Jan. 2011) pp. 1-13.
(Continued)

*Primary Examiner* — Jahangir Kabir
(74) *Attorney, Agent, or Firm* — Thomas | Horstemeyer, LLP; David R. Risley; Jason M. Perilla

(57) ABSTRACT

A magnetic random access memory (MRAM) physically unclonable function (PUF) device that uses the geometric variations in magnetic memory cells to generate a random PUF response is described herein. Within the MRAM, one or more magnetic memory cells can be used for the PUF. The PUF response is generated by destabilizing the one or more magnetic memory cells and then allowing them to relax. The MRAM PUF has also a relatively small footprint among all other silicon PUFs. Timing and control signals for the MRAM PUF are also described along with power and delay characteristics for use with field and spin transfer torque driven destabilization operations.

20 Claims, 13 Drawing Sheets

(51) Int. Cl.

| | | |
|---|---|---|
| H01L 43/08 | (2006.01) | |
| G11C 11/15 | (2006.01) | |
| G11C 11/16 | (2006.01) | |
| G11C 19/08 | (2006.01) | |
| G06F 21/73 | (2013.01) | |
| G11C 16/20 | (2006.01) | |

(52) U.S. Cl.
CPC ...... *G11C 11/1659* (2013.01); *G11C 11/1695* (2013.01); *G11C 16/20* (2013.01); *G11C 19/0866* (2013.01); *H01L 43/08* (2013.01); *H04L 9/06* (2013.01)

(58) Field of Classification Search
USPC .......................................................... 380/28
See application file for complete search history.

(56) References Cited

U.S. PATENT DOCUMENTS

| | | | | |
|---|---|---|---|---|
| 6,741,513 | B2 | 5/2004 | Honigschmid et al. | |
| 8,516,269 | B1* | 8/2013 | Hamlet | G06F 21/445 340/5.8 |
| 8,639,949 | B2 | 1/2014 | Van Rijnswou | |
| 8,667,265 | B1* | 3/2014 | Hamlet | H04L 9/0866 326/80 |
| 8,848,905 | B1* | 9/2014 | Hamlet | H04K 1/04 380/35 |
| 9,018,972 | B1* | 4/2015 | Gurrieri | H03K 19/003 326/8 |
| 9,070,457 | B2* | 6/2015 | Ohno | H01F 10/3254 |
| 9,165,143 | B1* | 10/2015 | Sanders | G06F 21/575 |
| 9,208,355 | B1* | 12/2015 | Areno | G06F 21/73 |
| 9,245,608 | B2* | 1/2016 | Chen | G11C 11/161 |
| 9,378,792 | B2* | 6/2016 | Houssameddine | G11C 11/16 |
| 2004/0130935 | A1* | 7/2004 | Gider | G11C 11/16 365/158 |
| 2005/0030799 | A1* | 2/2005 | Smith | G11C 11/16 365/199 |
| 2005/0047202 | A1* | 3/2005 | Shimizu | G11C 11/16 365/158 |
| 2005/0111253 | A1* | 5/2005 | Park | G11C 11/16 365/158 |
| 2006/0126371 | A1* | 6/2006 | Nagase | B82Y 10/00 365/145 |
| 2008/0037179 | A1* | 2/2008 | Ito | G11C 11/16 360/313 |
| 2009/0016098 | A1* | 1/2009 | Wunderlich | G11C 11/5607 365/158 |
| 2009/0302403 | A1* | 12/2009 | Nguyen | G11C 11/16 257/421 |
| 2010/0110756 | A1* | 5/2010 | Khoury | G11C 11/1675 365/148 |
| 2010/0315865 | A1* | 12/2010 | Wang | G11C 11/1659 365/158 |
| 2011/0145600 | A1 | 6/2011 | Rudelic | |
| 2012/0106235 | A1 | 5/2012 | Christensen et al. | |
| 2012/0241884 | A1* | 9/2012 | Aikawa | H04L 43/08 257/421 |
| 2013/0106410 | A1* | 5/2013 | Liu | G01R 33/0029 324/246 |
| 2013/0119495 | A1* | 5/2013 | Vetr | H01L 43/08 257/421 |
| 2013/0141137 | A1 | 6/2013 | Krutzik et al. | |
| 2013/0194886 | A1 | 8/2013 | Schrijen et al. | |
| 2013/0254636 | A1 | 9/2013 | Kirkpatrick et al. | |
| 2014/0067890 | A1 | 3/2014 | Zhu et al. | |
| 2014/0281189 | A1* | 9/2014 | Noguchi | G11C 13/004 711/104 |
| 2015/0071432 | A1* | 3/2015 | Zhu | G11C 11/1673 380/28 |

OTHER PUBLICATIONS

Carlton, D.; et, al., "Investigation of Defects and Errors in Nanomagnetic Logic Circuits" IEEE Transactions on Nanotechnology, vol. 11, No. 4 (Jul. 2012) pp. 760-762.
Naji, P.K.; et, al., "A 256kb 3.0V 1T1MTJ Nonvolatile Magnetoresistive RAM" IEEE International Solid-State Circuits Conference (Feb. 2001) 3 pages.
Tehrani, S.; et, al., "Recent Developments in Magnetic Tunnel Junction MRAM" IEEE Transactions on Magnetics, vol. 36, No. 5 (Sep. 2000) pp. 2752-2757.
Slaughter, J.M.; et, al., "Fundamentals of MRAM Technology" Journal of Superconductivity: Incorporating Novel Magnetism, vol. 15, No. 1 (Feb. 2002) pp. 19-25.
Csaba, G.; et, al., "Behavior of Nanomagnet Logic in the Presence of Thermal Noise" Computational Electronics (Dec. 2010) 4 pages.
Niemier, M.T.; et al., "Clocking Structures and Power Analysis for Nanomagnet-Based Logic Devices" ResearchGate (Aug. 2007) 7 pages, DOI: 10.1145/1283780.1283787.
Das, J.; et, al., "Ultra-Low Power Hybrid CMOS-Magnetic Logic Architecture" IEEE Transactions on Circuits and Systems—I: Regular Papers, vol. 59, No. 9 (Sep. 2012) pp. 2008-2016.
Das, J.; et, al., "Nano Magnetic STT-Logic Partitioning for Optimum Performance" IEEE Transactions on Very Large Scale Integration (VLSI) Systems, vol. 22, No. 1 (Jan. 2014) pp. 90-98.
Pappu, R.; et, al., "Physical One-Way Functions" Science, vol. 297 (Sep. 2002) pp. 2026-2030.
Lee, K.; et, al., "Design Consideration of Magnetic Tunnel Junctions for Reliable High-Temperature Operation of STT-MRAM" IEEE Transactions on Magnetics, vol. 46, No. 6 (Jun. 2010) pp. 1537-1540.
Donahue, M. and Porter, D., "OOMMF User's Guide" NIST (Sep. 1999) pp. 1-83.
Cargnnini, L.V.; et, al., "Embedded memory hierarchy exploration based on Magnetic RAM" IEEE, Faible Tension Faible Consommation (Jun. 2013) 4 pages.
International Search Report for PCT/US2015/032914 dated Sep. 3, 2015.
Gassend et al., "Controlled Physical Random Functions and Applications," ACM Trans. Inform. Syst. Secur., Jan. 2008, vol. 10, No. 4, Article 15.
Das et al., "A Novel Geometry Based MRAM PUF," Proc. IEEE 14th Int. Conf. on Nanotechnology, Aug. 2014, pp. 859-863.
Das et al., "MRAM PUF: A Novel Geometry Based Magnetic PUF with Integrated CMOS," IEEE Trans. on Nanotechnology, May 2015, vol. 14, No. 3, pp. 436-443.
Roel, M., "Physically Unclonable Functions: Constructions Properties and Applications," PhD Thesis University of KU Leuven 2012.
Suh et al., "Physical Unclonable Functions for Device Authentication and Secret Key Generation," DAC, Jun. 2007, pp. 9-14.
Guajardo et al., "Anti-Counterfeiting Key Distribution and Key Storage in an Ambient World Via Physical Unclonable Functions," Information Systems Frontiers, 2009, vol. 11, No. 1, pp. 19-41.
Ruhrmair et al., "Applications of High-Capacity Crossbar Memories in Cryptography," IEEE TNANO, 2011, vol. 10, No. 3, pp. 489-498.
Rajendran et al., "Nano-PPUF: A Memristor-Based Security Primitive," 2012 IEEE Computer Soc. Ann. Symp. on VLSI, 2012, pp. 84-87.
Yuasa et al. "Giant Tunnel Magnetoresistance in Magnetic Tunnel Junctions with a Crystalline MGO (0 0 1) Barrier," J. of Physics D: Applied Physics, 2007, vol. 40, No. 21, pp. R337.
Csaba et al., "Simulation of Power Gain and Dissipation in Field-Coupled Nanomagnets," J. Computational Electronics, 2005, vol. 4, No. 1-2, pp. 105-110.
Das et al., "Low Power Magnetic Quantum Cellular Automata Realization Using Magnetic Multi-Layer Structures," IEEE J. Emerging and Selected Topics in Circuits and Systems, 2011, vol. 1, No. 3, pp. 267-276.
Driskill-Smith, A., "Latest Advances and Future Prospects of STT-RAM," Proc. Non-Volatile Memories Workshop, Apr. 2010, Univ. of California.

(56) References Cited

OTHER PUBLICATIONS

Zhu et al., "Magnetic Tunnel Functions," Mater. Today, 2006, vol. 9, No. 11, pp. 36-45.
Koeberl et al., "Memristor PUFs: A New Generation of Memory-Based Physically Unclonable Functions," Proc. Conf. Design Autom. Test, 2013, pp. 428-431.
Rose et al., "A Write-Time Based Memristive PUF for Hardware Security Applications," Proc. IEEE/ACM Int. Conf. Computer-Aided Design, 2013, pp. 830-833.
Zhang et al., "Highly Reliable Memory-Based Physical Unclonable Function Using Spin-Transfer Torque MRAM," Proc. IEEE Int. Symp. Circuits Systems, 2014.
Tudosa et al., "Perpendicular Spin-Torque Switching with a Synthetic Antiferromagnetic Reference Layer," Appl. Phys. Letters, 2010, vol. 96, pp. 212504-212506.
Csaba et al., "Nanocomputing by Field-Coupled Nanomagnets," IEEE Trans. Nanotechnology, Dec. 2002, vol. 1, No. 4, pp. 209-213.
Akerman, J., "Toward a Universal Memory," Science, 2005, vol. 308, No. 5721, pp. 508-510.
Wolf et al., "The Promise of Nanomagnetics and Spintronics for Future Logic and Universal Memory," Proc. IEEE, Dec. 2010, vol. 98, No. 12, pp. 2155-2168.
Cargnini et al., "Embedded memory hierarchy exploration based on magnetic random access memory," J. Low Power Electron. Appl., 2014, vol. 4, pp. 214-230.

\* cited by examiner

MAGNETIC MEMORY PHYSICALLY UNCLONABLE FUNCTIONS

CROSS-REFERENCE TO RELATED APPLICATIONS

This application is the 35 U.S.C. § 371 national stage application of PCT Application No. PCT/US2015/032914, filed May 28, 2015, which claims the benefit of U.S. Provisional Application No. 62/030,914, filed Jul. 30, 2014, the entire contents of both of which applications are hereby incorporated herein by reference.

GOVERNMENT LICENSE RIGHTS

This invention was made with government support under contract numbers 0639624 awarded by the National Science Foundation. The government has certain rights in the invention.

BACKGROUND

Physically unclonable functions (PUFs) rely upon a type of challenge-response authentication. A PUF may be embodied as a physical device or structure which is relatively easy to evaluate but difficult to predict. The response of a unique PUF device should be practically impossible to duplicate, even using the same process used to manufacture it. In this regard, a unique PUF device may be considered the hardware equivalent of a unique one-way function.

Rather than relying upon a single key, PUFs makes use of challenge-response authentication. When a stimulus is applied to the physical device or structure, it generates an unpredictable but repeatable response. The response may be due to the interaction of the stimulus with the physical microstructure of the device. In this context, the applied stimulus is called the challenge, and the reaction of the PUF to the stimulus is called the response. A challenge and its response together form a challenge-response pair. A challenge-response pair, once known, can be used to verify or authenticate a device, for example, or for other purposes.

BRIEF DESCRIPTION OF THE DRAWINGS

For a more complete understanding of the embodiments described herein and the advantages thereof, reference is now made to the following description, in conjunction with the accompanying figures briefly described as follows.

Figure 1:
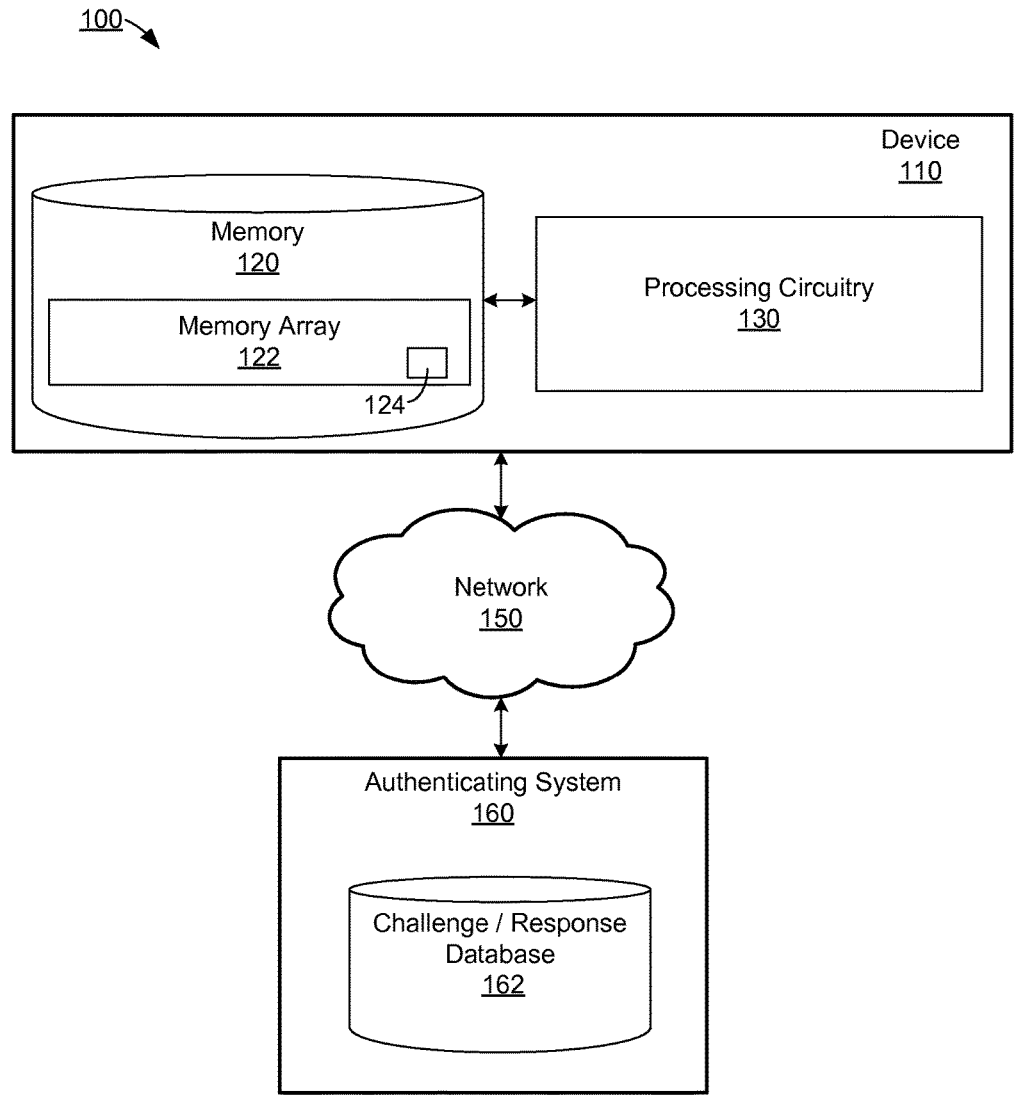
FIG. 1 illustrates a system for device authentication according to various example embodiments described herein.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

As described above, PUFs rely upon a type of challenge-response authentication. When a stimulus is applied to a PUF device or structure, it generates an unpredictable but repeatable response. The response may be due to the interaction of the stimulus with the physical structure of the device. In this context, the applied stimulus is called the challenge, and the reaction of the PUF to the stimulus is called the response. A challenge and its response together form a challenge-response pair.

According to one definition for a PUF, (i) at the time of its creation, a PUF may be created without any user control over it; (ii) the PUF is unique and specific to every instance; and (iii) creating two PUF instances, i.e., $PUF_1$ and $PUF_2$, that produce the same response to the same challenge is not feasible. As noted above, two terms are closely associated with PUF usage: i) challenge, which is an input $x_k \in X_P$ to the PUF, and ii) response, which is the PUF output y to the challenge. The challenge/response process may be called "evaluating" the PUF. There are two statistical parameters which determine the usability of a PUF class P, where $puf_i \in P$, including i) intra-distance $D_{intra}$, where the hamming distance or the fractional hamming distance between two random evaluations $y_{j1}$ and $y_{j2}$ of a single PUF instance $puf_i$ with the same challenge $x_k \in X_P$, and ii) inter-distance, where $D_{inter}$ is the hamming distance or the fractional hamming distance between the evaluations $y_{j1}$ and $y_{j2}$ of two different PUF instances $puf_{i1}$ and $puf_{i2}$, $i_1 \neq i_2$ for the same challenge $x_k \in X_P$.

A PUF class P should display certain basic properties. Informal quantifiers such as "easy," "hard," "high," and "low" are typically used to define the following properties: i) constructibility, where constructing a random PUF instance $puf_i$ should be relatively easy; ii) evaluability, where evaluating the response of any $puf_i$ to a random challenge $x_k \in X_P$ should be relatively easy; iii) reproducibility, where when evaluated multiple times, a PUF should generate the same response to the same challenge with a relatively high probability (i.e., a PUF instance should have a low $D_{intra}$); and iv) uniqueness, where the response of two different PUF instances to the same challenge should be highly dissimilar (i.e., a PUF class should have a high $D_{inter}$).

Among other devices, certain memory devices incorporate PUF features. The static RAM (SRAM) PUF is one example of a memory-based PUF. An SRAM PUF uses the power-up state of an SRAM cell to generate a PUF response. An SRAM cell may be composed of a cross-coupled inverter latch designed to achieve symmetry between inverter pairs. Variations in process technology, however, may result in device mismatches specific to every SRAM cell. These mismatches result in a random but preferred power-up state for every cell. Thus, using the mismatches, the power-up state in SRAM cells may be employed to build an SRAM PUF. The latch PUF is another example of a memory-based PUF. In a latch PUF, the mismatch between two cross-coupled NOR gates is used to generate a PUF response. Further, nanoscale PUFs based on memristive crossbars with uncontrollable variations in the thickness, area, and concentration of oxygen vacancies of memristive elements have been proposed.

According to the embodiments described herein, the application of PUF features in magnetic memory cells and arrays are described. A magnetoresistive random access memory (MRAM) is one example of device which incorporates magnetic memory cells. The high density, endurance, thermal robustness, and radiation hardness of MRAM makes it a potential candidate for a universal memory used across platforms. The growing popularity of MRAM devices calls for a greater role of the technology beyond storage purposes. One such application is in the authentication of integrated circuits.

According to aspects of the embodiments, the geometric variations in magnetic memory cells, such as magnetic tunnel junction (MTJ) cells, are used to generate a random PUF response. The PUF response is generated by destabilizing one or more MTJ cells, allowing them to relax, and then reading their associated responses. The MRAM PUF generates very high entropy, a low $D_{intra}$, and a high $D_{inter}$. It has also a relatively small footprint among silicon PUFs. Timing and control signals for the MRAM PUF are also provided along with power and delays associated with field driven and STT driven destabilization operations.

Turning to the drawings, various aspects of the embodiments are described in further detail.

FIG. 1 illustrates a system 100 for device authentication according to various example embodiments described herein. The system 100 includes a device 110, a network 150, and an authenticating system 160. Among other elements, the device 110 includes a memory 120 device and processing circuitry 130. The memory 120 device includes a memory array 122 formed from any suitable type or types of memory cells. In one embodiment, the memory array 122 includes, at least in part, an array of magnetic memory cells, such as MTJ cells. At least a portion 124 of the memory array 122 includes magnetic memory cells reserved for PUF functions.

The device 110 can be embodied as any device that includes processing circuitry and memory, such as a television, computer, set-top box, appliance, cellular telephone, camera, or other computing device, without limitation. The processing circuitry 130 includes a processor or processing circuit embodied in any suitable form. For example, the processing circuitry 130 may be embodied as one or more discrete logic circuits having logic gates for implementing various logic functions, application specific integrated circuits (ASICs), field-programmable gate arrays (FPGAs), general purpose processors, or other circuits or circuitry, without limitation.

The network 150 can include one or more local interfaces, local networks, local area networks (LANs), wide area networks (WANs), intranets, extranets, the Internet, or other networks, regardless of whether composed of wired, wireless, cable, satellite, other types of networks, or any combinations thereof. The authenticating system 160 can communicate with the device 110 over the network 150 using any suitable communications protocol.

The authenticating system 160 may be embodied as any computing system and is configured to authenticate the device 110 by issuing a challenge to the device 110 over the network 150. Upon receipt of the challenge, the processing circuitry 130 of the device 110 presents the challenge to the memory 120 device. The memory 120 device, in turn, processes the challenge by accessing one or more cells in the portion 124 of the memory array 122. The memory 120 device then returns the response from the one or more cells to the processing circuitry 130, and the processing circuitry 130 returns the response to the authenticating system 160 over the network 150. Once the response is received at the authenticating system 160, the authenticating system 160 is configured to compare the response received from the device 110 to an expected response for the original challenge with reference to the challenge/response database 162.

If the response received from the device 110 matches with the expected response, then the authenticating system 160 authenticates the device 110. Otherwise, the authenticating system 160 cannot authenticate the device 110. In this way, the authenticating system 160 (or other system) can confirm the identity, operating parameters, manufacturer, or other characteristics of the memory device 120 and/or the device 110. For example, as a measure of quality or integrity assessment, a company can verify that their products were assembled with memory devices manufactured by a certain manufacturer, by presenting challenges to the memory devices and interfacing with a challenge/response database of the manufacturer to compare the responses. In other cases, the memory 120 device may be locked or unlocked based on the authentication.

Figure 2:
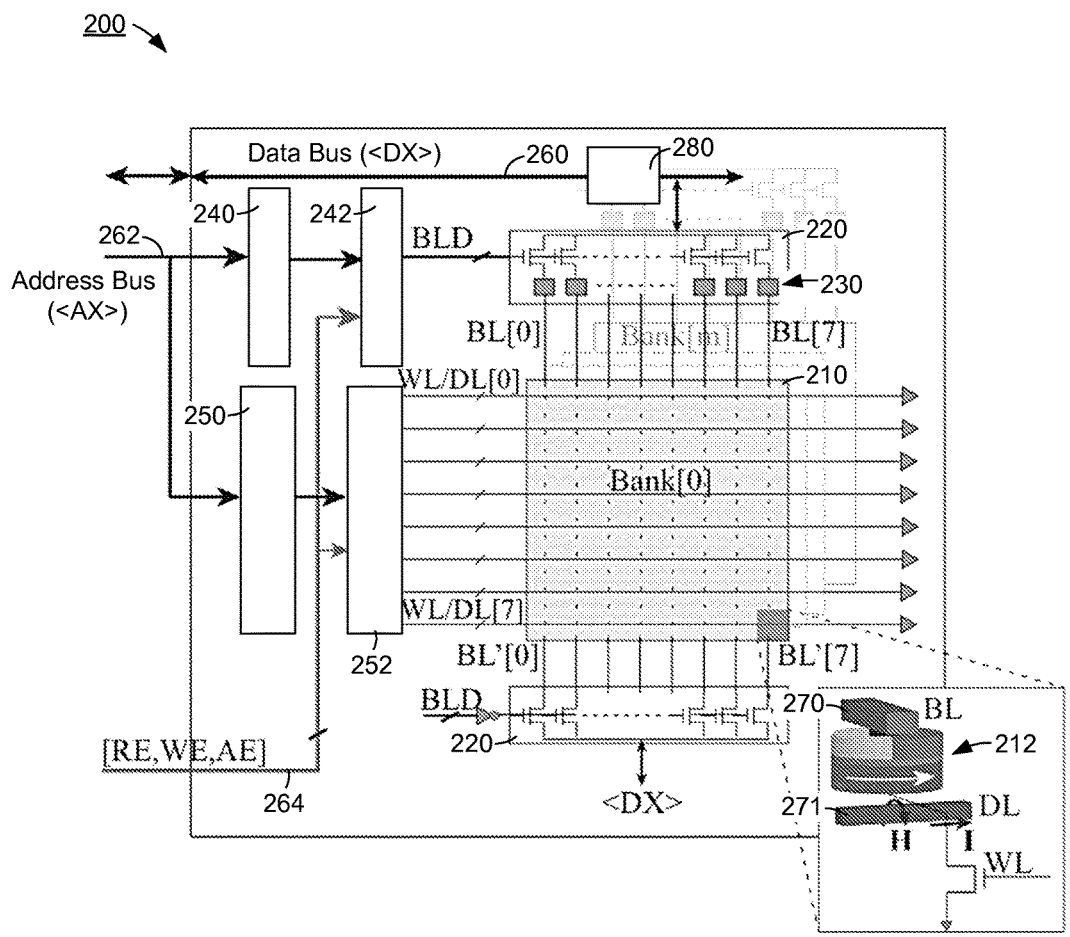
FIG. 2 illustrates a memory device including magnetic memory cells according to various example embodiments described herein.

FIG. 2 illustrates a memory device 200 including magnetic memory cells according to various example embodiments described herein. In that it includes magnetic memory cells reserved for PUF functions, the memory device 200 in FIG. 2 is similar to the memory device 120 in FIG. 1. As shown, the memory device 200 includes a memory array 210, banks of access transistors 220, sense amplifiers 230, a column decoder 240, a bitline (BL) driver 242, a row decoder 250, a wordline (WL) and digitline (DL) driver 252, a data bus (DX) 260, an address bus (AX) 262, control signal inputs 264, and an encrypter 280. The column decoder 240 and the row decoder 250 may be referred to, collectively, as a decoder. Similarly, the BL driver 242 and the WL and DL driver 252 may be referred to, collectively, as a driver. The logical control signal inputs to the drivers 242 and 252 include read enable (RE), write enable (WE), and authentication enable (AE) inputs. It should be appreciated that the illustration of the memory device 200 in FIG. 2 is provided by way of example and for discussion of representative memory devices. The illustration is not intended to be limiting as to the type or scope of memory devices with which the concepts described herein may be applied.

The memory array 210 includes an array of magnetic memory cells, such as MTJ cells, one of which is designated in FIG. 2 as MTJ cell 212. As described in further detail below with reference to FIG. 4, the MTJ cell 212 includes a free layer in which the orientation of magnetization is alterable and a fixed layer in which the magnetization is fixed in a particular direction. The free layer can be relied upon to store data by manipulating its orientation of magnetization.

In the architecture shown in FIG. 2, the column decoders 240 and row decoders 250 are configured to decode a combination of the WL, DL, and BL lines for access to one or more magnetic memory cells in the memory array 210, such as the MTJ cell 212, with reference to the input of a logical address value on the address bus 262. In that context, once a combination of the WL, DL, and BL lines are decoded and electrically actuated, the MTJ cell 212 may be accessed, written to, and read from through the banks of access transistors 220, the sense amplifiers 230, and the data bus 260, as would be understood by those having skill in the art. Further, using the RE, WE, and AE logical control signal inputs, the memory device 200 may be operated in read, write, and authenticate modes as described herein.

As with the other MTJ cells in the memory array 210, energy minimum configurations arising from shape anisotropy are used to store data values of "0" and "1" in the MTJ cell 212. The orientation of magnetization in the free layer of the MTJ cell 212 generally aligns along an axis referred to as the easy axis of the cell. External magnetic fields (e.g., "H" in FIG. 2) generated through current (e.g., "I" in FIG. 2) passing through the BL 270 and DL 271 can flip the orientation of the magnetization in the free layer of the MTJ cell 212 along the easy axis to either parallel or anti-parallel orientations with respect to the reference layer, depending on the desired logic state (e.g., "0" or "1"). The magnitudes of the magnetic fields can be selected to be large enough so that the MTJ cell 212 switches its logic state, but low enough so that the other magnetic memory cells in the memory array 210 do not switch. Alternatively, logic values may be written to or read from the MTJ cell 212 using spin transfer torque generated by current flowing through the MTJ cell 212.

Figure 3A:
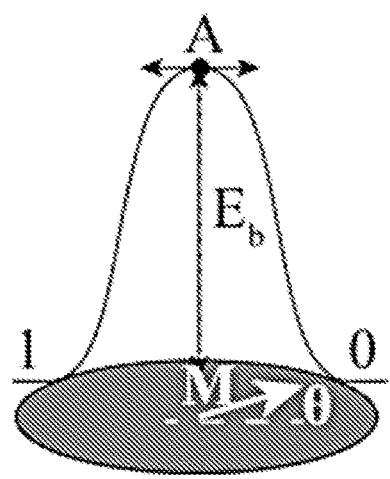
FIGS. 3A-3C illustrate the structure and logic states of an example magnetic tunnel junction.
Figure 3B:
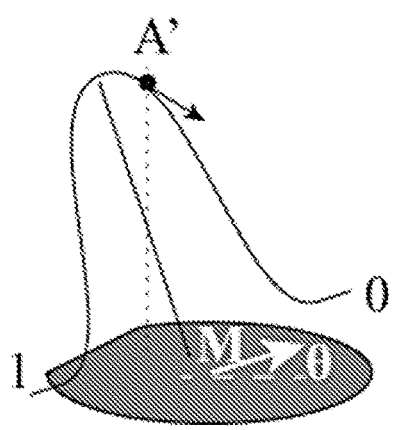
Figure 3C:
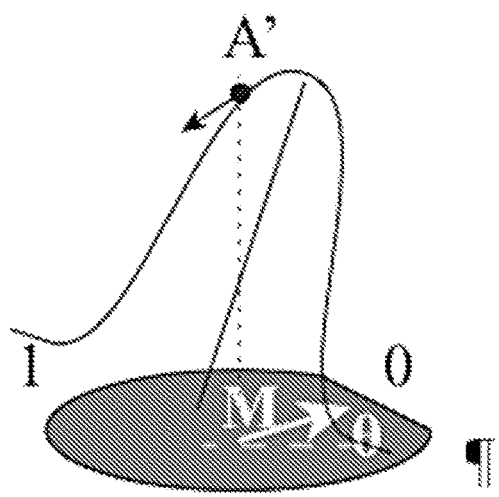

FIGS. 3A-3C illustrate various energy landscapes of an MTJ cell. For a rectangular or elliptical geometry of an MTJ cell, two stable configurations are symmetrically positioned across an energy barrier at room temperature, as illustrated in FIG. 2A. However, when process variations affect the geometry of MTJ cells, each gets a random and unique tilt in its energy barrier, such as the examples as illustrated in FIGS. 2B and 2C. As a result, with process variations, the point A in FIG. 2A shifts to a new random location A' unique to each MTJ cell (e.g., as in FIGS. 2A and 2B). Therefore, with variations, each MTJ cell in a memory array develops a preferred ground state which can be relied upon to incorporate MTJ PUF cells into a memory device. As further described below, the differences in tilt angles among various MTJ cells in a memory array generally follow a Gaussian distribution.

Figure 4:
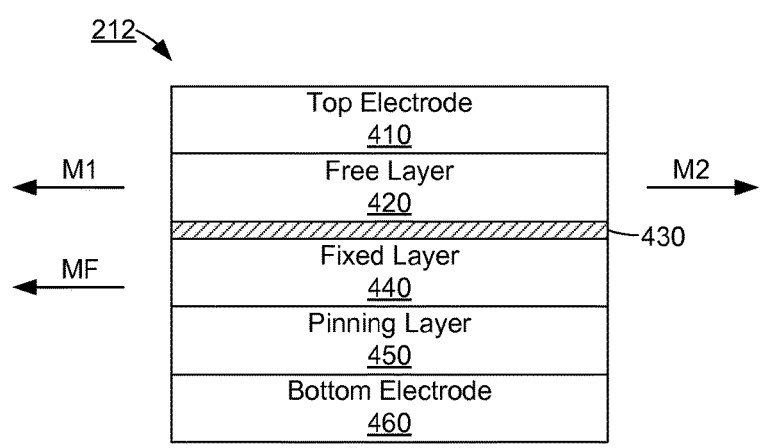
FIG. 4 illustrates the structure and logic states of an example MTJ cell in the memory device of FIG. 2 according to various example embodiments described herein.

Turning to FIG. 4, the structure and logic states of the example MTJ cell 212 in the memory device 200 of FIG. 2 are further illustrated. It should be appreciated that the illustration of the MTJ cell 212 in FIG. 4 is provided by way of example and for discussion of representative memory cells. The illustration is not intended to be limiting as to the type or scope of memory cells with which the concepts described herein may be applied. Apart from the top electrode 410 and the bottom electrode 460, the MTJ cell 212 includes three main layers, including a free single-domain ferromagnetic layer 420, an insulating tunneling barrier 430, and a fixed single-domain ferromagnetic layer 440. In some cells, as illustrated in FIG. 4, the magnetic domain of the fixed layer 440 can remain fixed through exchange coupling from a pinning layer 450.

In the MTJ cell 212, the magnetic domain of the free layer 420 can freely precess. In other words, the orientation of magnetization in the free layer 420 is not fixed and can assume two stable orientations, referenced by the arrows M1 and M2 in FIG. 4. On the other hand, the fixed layer 440 has a fixed orientation of magnetization referenced by the arrow MF. The orientation of magnetization of the free layer 420 can be rotated in response to electrical currents applied to the top electrode 410 and the bottom electrode 460, for example, which may be embodied as BL and DL lines, respectively, based on the architecture of the surrounding array. As described above, a logic value may be written to or read from the MTJ cell 212 using magnetic fields generated by current in the top electrode 410 and the bottom electrode 460 or by spin transfer torque generated by current flowing through the MTJ cell 212.

The first logic state of the MTJ cell 40 is established when the orientation of magnetization of the free layer 420 is substantially aligned or parallel with that of the fixed layer 440. For example, when the orientation of magnetization of the free layer 420 is in the M1 direction, a logic "0" state is stored in the MTJ cell 40. Conversely, a second logic state is established when the orientation of magnetization of the free layer 420 is antiparallel with that of the fixed layer 440. Thus, when the orientation of magnetization of the free layer 420 is in the M2 direction, a logic "1" state is stored in the MTJ cell 40. It is noted that, when current is passed though the MTJ cell 40, the logic "0" and logic "1" states have different resistance values. These values can be measured by a sense amplifier and compared against a reference value. The difference in resistances is captured by the term magnetoresistance.

Figure 5:
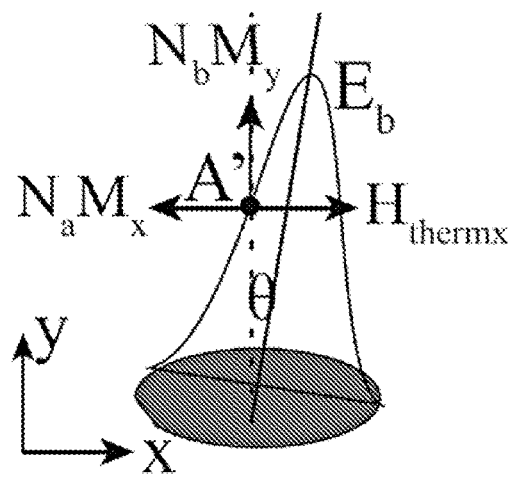
FIG. 5 illustrates an example energy profile of a magnetic memory cell in which the cell is taken to a hard axis or maximum energy state.

To use a magnetic memory cell as a PUF, the identification of unique, intrinsic process variations among MTJ cells is relied upon in the embodiments described herein. To further illustrate this concept, FIG. 5 illustrates an example energy profile of a magnetic memory cell in which the cell is taken to a hard axis or maximum energy state. That is, the effective fields acting on the cell at the time of release from the hard axis or energy maximum position is shown. It should be appreciated that, when an MTJ cell is released from its energy maximum state, the net force acting on it determines with a finite probability the preferred ground state that it is inclined to settle into. This inclination of the cell for one state increases with the increase in the easy axis tilt angle $\theta$ of the cell. In other words, with an increase in the easy axis tilt angle θ, a greater consistency in cell behavior can be expected. As applied to PUFs, any behavior of a cell that differs from its consistent behavior may be considered likelihood or probability for error. Thus, with increased easy axis tilt angle θ in MTJ cells, the more suitable the cells are as PUFs.

It is also noted that, in a device that makes use of spin transfer torque (STT), spin torque can be used to destabilize the free layer of an MTJ cell to generate a PUF response. In this case, the magnetic relaxation in the cell after the release of the torque would be the same as for field driven destabilization. The preferred ground state for the cell would again be decided by its unique geometric variations. The response from a PUF cell using STT can be read out with the help of tunnel magnetoresistance (TMR).

Figure 6:
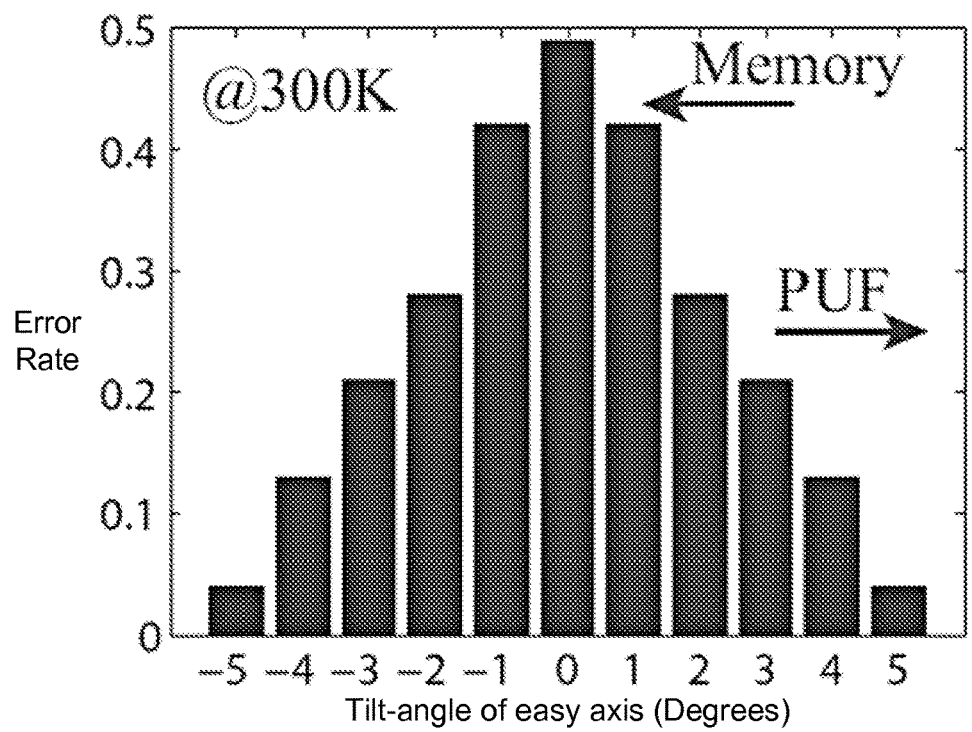
FIG. 6 illustrates an example error rate for MTJ PUF cells against tilt angle in easy axis.

FIG. 6 illustrates an example error rate at 300 degrees kelvin (K) for MTJ PUF cells against tilt angle in easy axis. The arrows in FIG. 6 are representative of the orthogonal requirements of intrinsic process variations in MTJ cells for use as MTJ memory cells and MTJ PUF cells. At θ=0, the cells have good geometry and display a near equal probability to settle for either of the ground states. Such cells are best suited for memory cells. As θ increases, the cells display a greater probability to settle for their preferred intrinsic ground state. These cells are preferable as PUF cells. From FIG. 6, it can be seen that a high tilt angle in the energy barrier of an MTJ cell may be related to a lower error rate during PUF evaluation. In one embodiment, for a PUF cell, a reasonable tilt angle may be selected between about −3°≥θ≥3°. In this context, the selection process for PUF cells may include a step of filtering out low error rate cells.

In an MTJ cell, the pinning layer typically couples to some extent with the fixed layer through a spacer, such as a Ruthenium spacer, and reduces the impact of the fixed layer on the free layer. When determining an appropriate thickness of the fixed layer ($d_f$) and an appropriate thickness of the pinning layer ($d_p$) in an MTJ cell, it is noted that the coupling between the free and fixed layers should be kept as close as possible to zero. When kept close to zero, the free layer acts as a single layer nanomagnet, without impact from the fixed layer. This is an important factor for PUF evaluation, because any error rate in PUF evaluation attributed to the impact of the fixed layer on the free layer can be reduced as much as possible.

Figure 7:
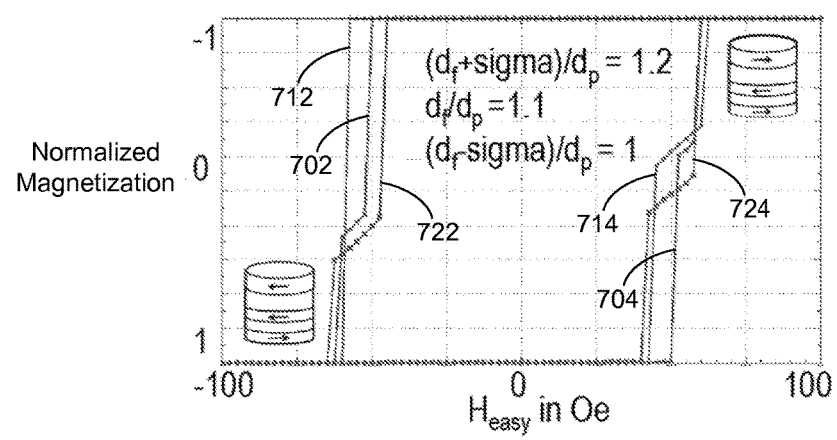
FIG. 7 illustrates a multilayer hysteresis plot of an MTJ cell according to various aspects of the embodiments described herein.

With further regard to the impact of the fixed layer on the free layer, FIG. 7 illustrates a multilayer hysteresis plot of an MTJ cell according to various aspects of the embodiments described herein. For $d_f/d_p$=1.1, curves 702 and 704, symmetry in the loop indicates zero coupling between the free and the fixed layers of the MTJ cell. The other hysteresis loops, $d_f$+σ, curves 712 and 714, and $d_f$−σ, curves 722 and 724, are generated for thicknesses of the fixed layer with σ=9% in the conservative range.

According to aspects of the embodiments, the behavior of a PUF cell may be defined by Equation 1 below:

$$\frac{dM}{dt} = -\gamma M \times H_{eff} + \alpha M \times \frac{dM}{dt}, \quad (1)$$

where M is the single-domain magnetization vector of the cell, $H_{eff}$ is the effective magnetization field on the cell generated from a combination of anisotropy (NM), external fields ($H_{Zeeman}$), and thermal effects ($H_{therm}$), given by $H_{eff}$=NM+$H_{Zeeman}$+$H_{therm}$.

In Equation 2 below, N is the demagnetization tensor, which takes into account the shape anisotropy of the cell. For an ellipsoid with axes (a>b>c), N is given by a diagonal matrix provided by Equation 2, where each term of the diagonal matrix is defined by Equation 3. $H_{therm}$ is given by Equation 4. The terms in Equations (1)-(4) are defined in Table 1.

$$N = \begin{vmatrix} N_a & 0 & 0 \\ 0 & N_b & 0 \\ 0 & 0 & N_c \end{vmatrix} \quad (2)$$

$$N_i = \frac{1}{2}abc \int_0^\infty \left[(i^2+\eta)\sqrt{(a^2+\eta)(b^2+\eta)(c^2+\eta)}\right]^{-1} d\eta \quad (3)$$

$$H_{therm} = \frac{1}{\sqrt{V\Delta T}} \sqrt{\frac{2k_B T\alpha}{\mu_0 \gamma M_S}} g(t), \quad (4)$$

In Equation 4, g(t) is a Gaussian distributed random vector.

TABLE 1

| Symbols | Meaning |
| --- | --- |
| γ | Gyromagnetic ratio |
| α | Damping constant |
| V | Volume of cell |
| ΔT | Integration time step |
| $k_B$ | Boltzmann constant |
| T | Absolute temperature |
| $\mu_0$ | Permeability of free space |
| $M_S$ | Saturation magnetization |

Depending on the underlying technology, PUF cells may be destabilized (i.e., M=$M_s$) either by current generated magnetic field or current induced STT. Below, both techniques for destabilization are discussed in the general framework of an MRAM array.

As discussed in further detail below, by fabricating, simulating, and testing MTJ cells, certain properties and behaviors of the MTJ cells have been analyzed with an aim toward use as PUF cells. It is noted at the outset that, by placing MTJ cells relatively far apart in an MRAM array, memory designers may ensure zero or near zero neighbor interaction between cells. This may be an important factor for PUF evaluation as it ensures high entropy among PUF response bits. For example, through micromagnetic simulations, dipolar coupling was observed between 90×60 $nm^2$ cells spaced 20 nm apart, while the lack of effective coupling (i.e., zero or near zero coupling) was observed between 90×60 $nm^2$ cells spaced 250 nm apart. However, any suitable cell spacing may be used among the embodiments.

Figure 8:
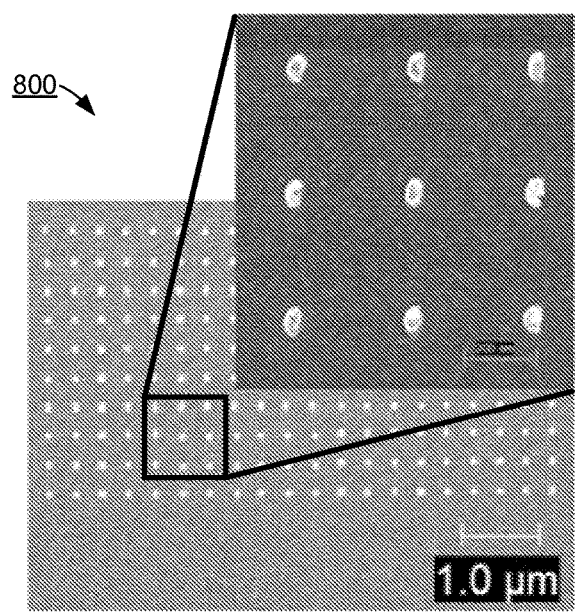
FIG. 8 illustrates a scanning electron microscope image of an array of MTJ PUF cells with variations in cell geometry, including a magnified 3×3 section of the array.

FIG. 8 illustrates a scanning electron microscope image of an array 800 of MTJ PUF cells with variations in cell geometry, including a magnified 3×3 section of the array 800. To verify MTJ PUF cell behavior, the cells in FIG. 8 were fabricated in a 10×20 array to observe geometric variation and experimentally characterize the tilt angle and preferred ground state of the cells. The dimensions of each of the PUF cells in FIG. 8 are about 90×60×18 $nm^3$ with a vertical and horizontal spacing of 250 nm. The array 800 was used to determine the randomness in cell geometry and guide simulations to calculate the reproducibility and uniqueness in MTJ PUF cells. The array 800 was fabricated using standard electron beam lithography process. A Hitachi® SU-70 retrofitted with a nanometer pattern generation system (NPGS) and operating at 30 kV was used to expose patterns on an Si wafer with a single layer of 50 nm polymethyl methacrylate (PMMA) resist. Permalloy was evaporated at 0.3 Ås$^{-1}$ using a Varian® model 980-2462 electron beam evaporator (EBE). A Digital Instruments 3100 scanning probe microscope was utilized in magnetic force microscopy (MFM) mode for evaluation of the MTJ PUF cells. For topological measurements of the cells, the SEM was used.

For the MTJ PUF cells in FIG. 8, external magnetic fields were relied upon to destabilize the cells. When destabilized, each cell occupies its corresponding hard axis or saturation magnetization state. When released from this state (i.e., $H_{Zeeman}$=0), the cells start to relax in order to settle to their preferred ground states. The magnetic relaxation in the cells follows Equation 1 and is independent of the underlying destabilizing technique. The effective field $H_{eff}$ acting on the relaxing cell is given by Equation 6 below, where $M_x$ ($<M_y$) is a cell-specific random vector arising from the geometric variations in the cells and holds the key to the preferred ground state for the cell.

$$H_{eff} = \begin{vmatrix} H_x \\ H_y \\ H_z \end{vmatrix} = \begin{bmatrix} N_a & 0 & 0 \\ 0 & N_b & 0 \\ 0 & 0 & N_c \end{bmatrix} \begin{bmatrix} M_x \\ M_y \\ 0 \end{bmatrix} + H_{therm} \quad (6)$$

An entropy density function was relied upon to calculate randomness in the response of the MTJ PUF cells in the array 800. First, the cells were destabilized using an external magnetic field and then released. The cells were then MFM imaged. A high $p(y^n)$ indicates a high randomness among PUF cells. For the array 800 in FIG. 8, a $p(y^n)$ of 0.9997 was obtained, as outlined below in Table 2.

TABLE 2

| PUFs | $D_{intra}$ | $D_{inter}$ | $\rho(y^n) \leq$ | Area (μm$^2$) |
|---|---|---|---|---|
| SRAM | 0.078 | 0.49 | 0.94 | 51.99 |
| Latch | 0.26 | 0.3 | 0.71 | 531.25 |
| D F/F | 0.19 | 0.39 | 0.81 | 765.63 |
| Arbiter | 0.07 | 0.46 | 0.5-0.9 | 690.56 |
| Ring Osc | 0.099 | 0.46 | 0.86 | 7774.2 |
| MRAM | 0.0225 | 0.47 | 0.99 | 5.5 |

As for constructability, an MRAM PUF can rely upon the geometric variations in the MRAM cells. The metal lines in MRAM technology can be used to supply the required current for destabilizing the MTJ PUF cells when required for authentication. Thus, the integration of PUF features in MRAM devices does not require any significant processing steps beyond those currently used in conventional MRAM devices. Only certain hardware and current drivers beyond those currently found in conventional MRAM devices are needed to supply the destabilizing current.

Evaluating an MRAM PUF includes (i) destabilizing one or more MTJ PUF cells, (ii) releasing the cells, and, once the cells have relaxed and settled to their ground states, reading out their PUF responses using standard MRAM read techniques. In an MRAM, the contents of a cell are read by sensing the differential voltage generated from the comparison between the cell resistance and a reference value.

Figure 9A:
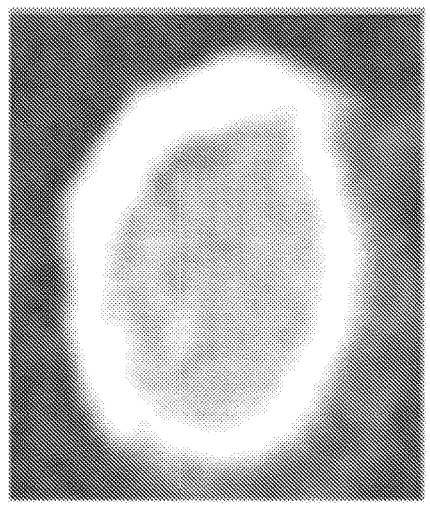
FIG. 9A illustrates a SEM image of an MTJ PUF cell from the array in FIG. 8 according to aspects of the embodiments described herein.
Figure 9B:
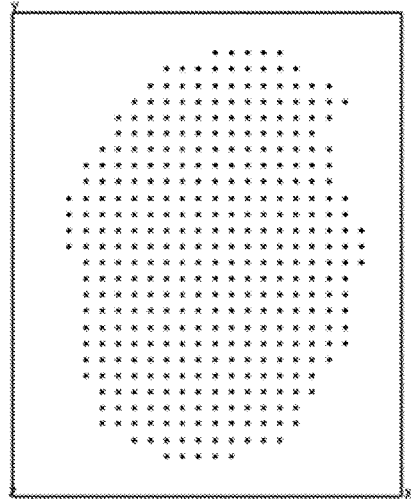
FIG. 9B illustrates a mask of the MTJ PUF cell in FIG. 9A.

The measure of reproducibility in a PUF is called the intra-distance $D_{intra}$. Stochastic Landau-Lifshitz-Gilbert (LLG) simulations were relied upon over the array 800 in FIG. 8 to evaluate $D_{intra}$. SEM images of fabricated cells were relied upon to generate masks in the LLG simulator. A total of 20 SEM images of cells were selected. FIG. 9A illustrates a SEM image of an MTJ PUF cell from the array 800 in FIG. 8A. The LLG mask of the MTJ PUF cell in FIG. 9A is illustrated in FIG. 9B. The masks were discretized into cubes of 3 nm sides. The region in the mask bounded by the cell periphery was filled with the same material used in the cell fabrication and the adjoining spaces were regarded as a vacuum to ensure that the simulations closely emulate cell behavior in free space. Stochastic LLG simulations were carried out at 300 degrees K with the easy axis of the cells oriented along the y-axis.

Figure 9C:
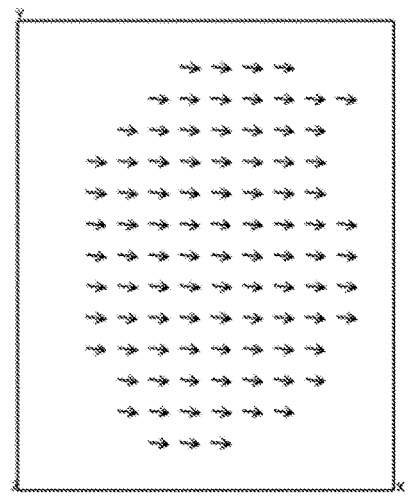
FIG. 9C illustrates the initialization or destabilization of an MTJ PUF cell uniformly along the hard axis according to aspects of the embodiments described herein.
Figure 9D:
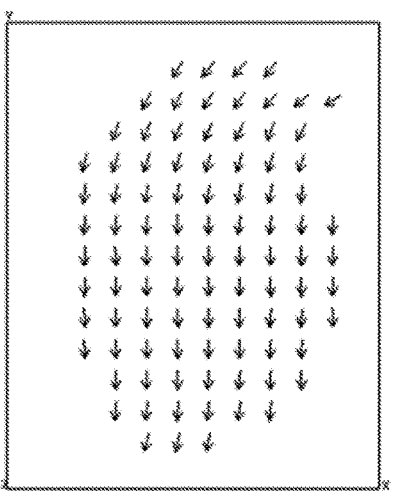
FIG. 9D illustrates the ground state of a settled MTJ PUF cell according to aspects of the embodiments described herein.

At the start of every simulation, the magnetic moment of each MTJ PUF cell was initialized or destabilized uniformly along the hard axis, as illustrated in FIG. 9C. The simulations were then run until the cell settled to its ground state, as illustrated in FIG. 9D. The procedures outlined among FIGS. 9A-D were repeated 40 times for the 20 selected MTJ PUF cells in FIG. 8. The direction that am MTJ PUF cell settled the majority of time was assumed to be its preferred settling state, and any inconsistency was regarded as error. Of the 20 cells measured, 16 were consistent in settling behavior. Of the 4 remaining, 3 showed some inconsistency in settling while 1 always remained stuck in the vortex state. After discarding the outlier cell, a total of 18 errors were recorded from 800 runs, yielding an average $D_{infra}$ of 0.0225, as outlined in Table 2 above.

As for uniqueness, the inter-distance $D_{inter}$ is the measure for uniqueness in the PUF instance. Through stochastic LLG simulations over three 4×5 subsets of fabricated arrays, $D_{inter}$ for an MRAM PUF was obtained. Masks for the cells were created in the same manner as the intra-distance simulations. The mask generation and simulation procedure was similar to the previous case. At the start of every simulation, the magnetic moments of every cell were initialized along the hard axis, and then released. Sufficient time was given to allow the cells to settle to their ground state. A 20-bit binary string obtained from reading the array in a raster fashion represented response from each array. The $D_{inter}$ was calculated using the fractional hamming distance between each pairwise 20-bit response string. The values were then averaged to obtain an average $D_{inter}$ of 0.47, as outlined in Table 2 above.

As for device size or area, an MRAM PUF has a significantly smaller footprint in comparison to other silicon PUFs. Table 2 above compares the area between different 64-bit PUFs. Generally, it is noted that the area overhead for the MJT PUF is minimal and can be divided into two categories: (i) current drivers to generate the required current for destabilizing the cells, and (ii) multiplexers to select between PUF and normal memory read/write voltage levels.

For the desired reproducibility in the MRAM PUF response, it is noted that MTJ PUF cells with tilt angles of about $-3° \geq \theta \geq 3°$ are preferred. A multiple evaluation step can be used to carry out this selection. Stochastic LLG simulations were performed over these specific cells ($-3° \geq \theta \geq 3°$) to analyze their robustness and suggest enhancements based on cell geometry. Each reported error rate E was obtained by calculating the normalized hamming distance over 100 simulations for each $\theta_i$. The results will be symmetrical for $\theta \leq -3°$. For a n-bit PUF, the error rate E is related to $D_{intra}$ as $$D_{intra} = \frac{1}{n}\sum_{i=1}^{n} \varepsilon_i,$$

where $\varepsilon_i$ is the error of PUR i of n.

Figure 10A:
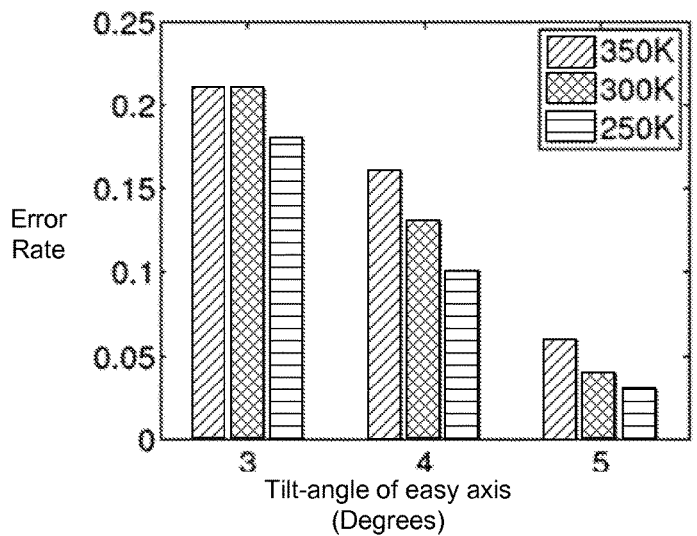
FIG. 10A illustrates error rate in PUF cells at different temperatures according to aspects of the embodiments described herein.
Figure 10B:
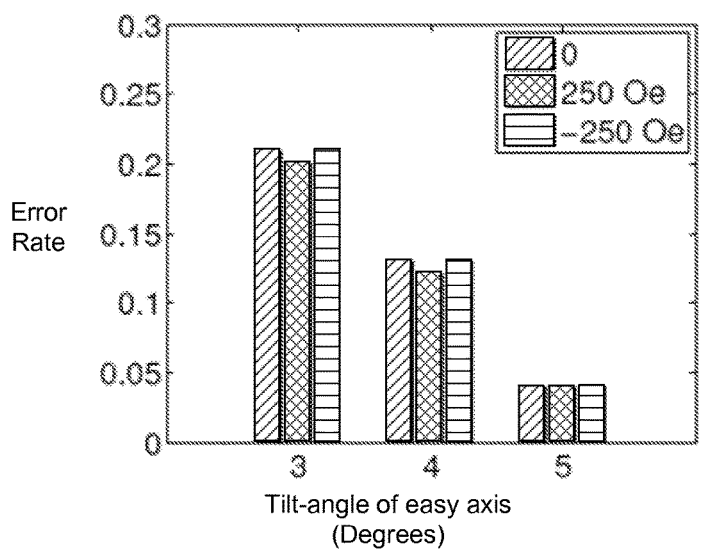
FIG. 10B illustrates error rate in PUF cells with thickness variation in the fixed layer according to aspects of the embodiments described herein.

As for robustness against temperature, FIG. 10A illustrates error rate in MTJ PUF cells at different temperatures. With an increase of 50 degrees K over room temperature, a maximum increase in error rate of only 0.03 is observed at θ=4°. On the other hand, the error rate decreases with decreasing temperature. Further, FIG. 10B illustrates error rate in MTJ PUF cells with thickness variation in fixed layer. The thickness variation was modeled with the help of a resultant coupling field on the free layer. In both cases, a cell size of 90×60×5 nm³ was simulated. It is noted that variations in the fixed layer cause non-zero coupling on the free layer of the MTJs (e.g., FIG. 7). This variation was emulated through a highly conservative coupling field of ±250 Oersted on the free layer. In FIG. 10B, it is clearly evident that the MRAM PUF is robust to the variations in the thicknesses of the fixed layer of the MTJs.

Figure 10C:
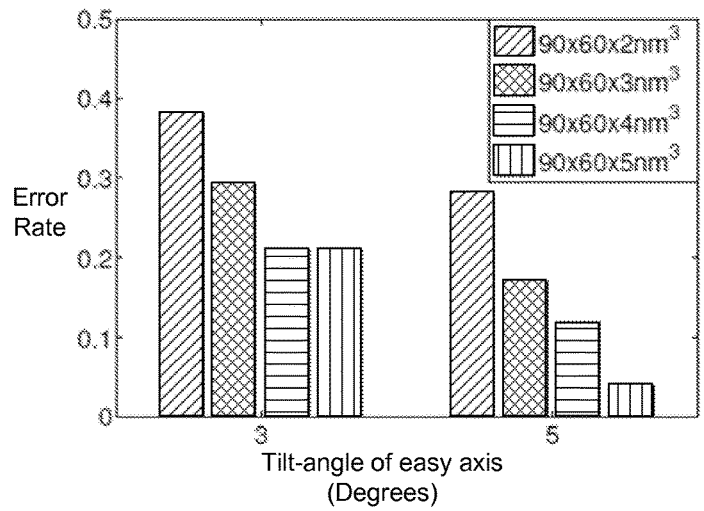
FIG. 10C illustrates error rate in PUF cells at 300K for different thicknesses of the free layer according to aspects of the embodiments described herein.

As to enhanced robustness with geometry, the goal is to identify different geometrical aspects of cells to increase the margin ($N_aM_x-H_{thermx}$) for the cells. This implies either (i) increasing $N_a$, which is a function of shape anisotropy (a/b) of the cell or (ii) decreasing $\sigma_{therm}$, which is a function of the overall volume (V=abc) of the cell (Equation 5). Increasing the volume at constant aspect ratio decreases the $\sigma_{Htherm}$ term and therefore increases the ($N_aM_x-H_{thermx}$) margin. As to increasing the cell thickness at constant area, FIG. 10C illustrates error rate in MTJ PUF cells at 300 degrees K for different thicknesses of the free layer. A sharp fall in error rate by as high as 0.24 is seen at θ=5° when the thickness is increased from 2 nm to 5 nm. A considerable drop in error rate by 0.11 at θ=5° is also observed for thickness increase from 2 nm to 3 nm.

Figure 10D:
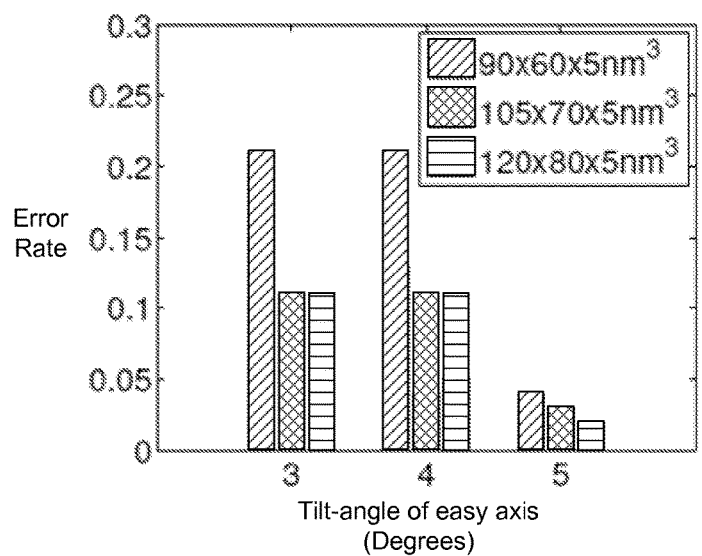
FIG. 10D illustrates error rate in PUF cells at 300K for different cell areas with same 3:2 aspect ratio according to aspects of the embodiments described herein.
Figure 10E:
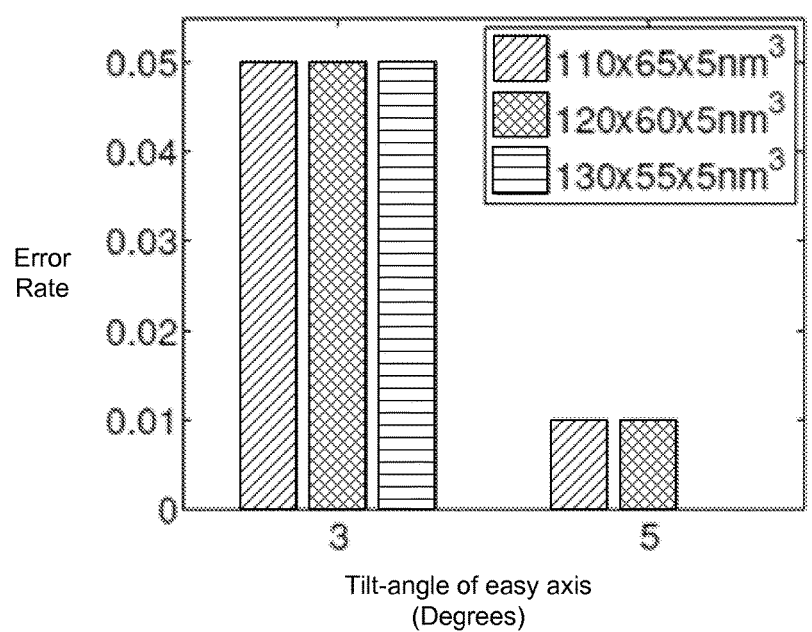
FIG. 10E illustrates error rate in PUF cells at 300K for different aspect ratios with same cell area according to aspects of the embodiments described herein.

As to increasing the cell area at constant thickness, FIG. 10D illustrates error rate in PUF cells at 300 degrees K for different cell areas with same 3:2 aspect ratio. A maximum error reduction by 0.1 is obtained at θ=3°, when the cell area is increased from 90×60 nm² to 120×80 nm². As to decreasing the aspect ratio at constant volume, this increases $N_a$ while keeping $\sigma_{Htherm}$ constant. However, as seen from FIG. 10E, this method is not very effective in enhancing the PUF robustness. Therefore, increasing the thickness by even 1 nm seems to be the most effective way to improve the robustness of MTJ PUF cells.

Table 3 summarizes the delay and current associated with the response generation and response read out phase of a STT-MRAM PUF clocked with field and STT current.

TABLE 3

| MRAM | | STT-MRAM | |
|---|---|---|---|
| Response generation | | | |
| Delay ($\tau_D$) | 5 ns | Delay | 5 ns |
| DL current ($I_D$) | 4 mA | SL current | 170 µA |
| WL voltage | 0 | WL voltage @ VDD = 1 V | 1 V |
| Avg. power @ VDD = 1 V for row of x cells | 4 mW | Avg. power @ VDD = 1 V for row of x cells | 170x µW |
| Response Readout | | | |
| Delay ($\tau_x$) | 5 ns | Delay | 5 ns |
| BL current | 30 µA | BL current | 30 µA |

Figure 11:
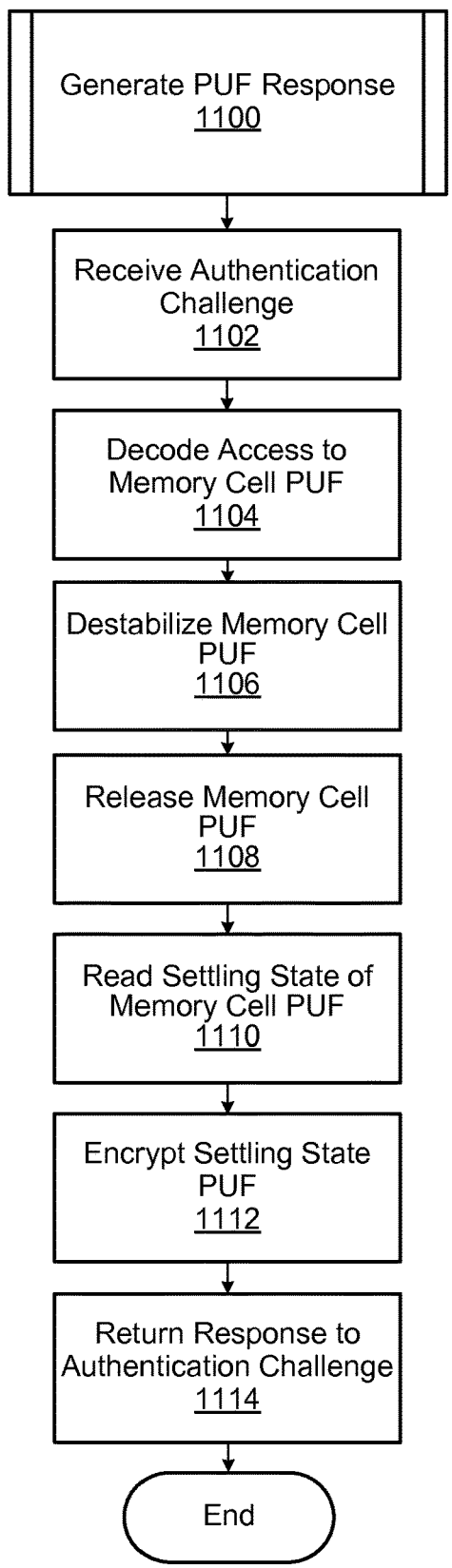
FIG. 11 illustrates a process for generating a PUF response to an authentication challenge.

FIG. 11 illustrates a process 1100 for generating a PUF response to an authentication challenge. Although the process 1100 is described below as being performed by the memory device 200 in FIG. 2, the process 1100 can be performed by other memory devices.

Figure 12:
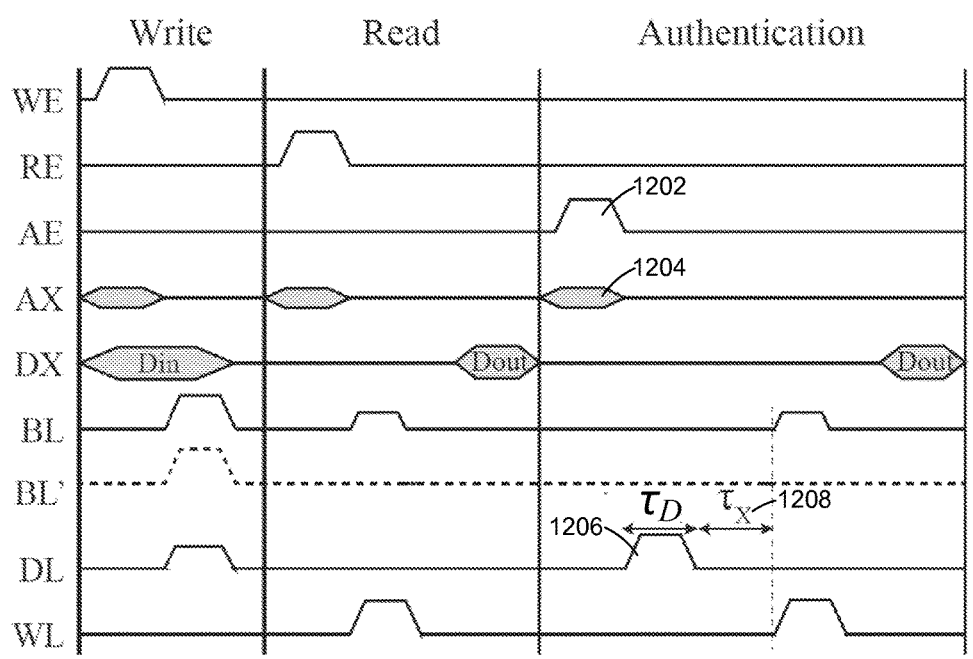
FIG. 12 illustrates timing signals which may be used in a memory device for the process of generating a PUF response to an authentication challenge.

At reference numeral 1102, the process 1100 includes receiving an authentication challenge at the memory device 200 (FIG. 2). As one example, receiving the authentication challenge may include the memory device 200 receiving a logical address signal and a logical authentication enable signal. For additional example context, FIG. 12 illustrates timing signals used for the process of generating a PUF response to an authentication challenge are illustrated. Receipt of the logical address signal is shown at reference numeral 1202, and receipt of the logical authentication enable signal is shown at reference numeral 1204.

The logical address signal can be associated with a certain PUF challenge, and the PUF challenge may be associated with one or more MTJ cells, such as the MTJ cell 212, in the memory device 200. In this context, it should be appreciated that, by incorporating PUF features, the memory device 200 can be capable of providing a unique response to any number of unique authentication challenges, where each authentication challenge is associated with a unique logical address signal. As further described below, because the memory device 200 decodes each unique logical address signal to access a particular MTJ cell or group of MTJ cells, each unique logical address signal is associated with a unique response to a unique authentication challenge.

At reference numeral 1104, the process 1100 includes the column decoder 240 and the row decoder 250 of the memory device 200 decoding a location of one or more MTJ cells associated with the PUF challenge in the memory array 210 based on the logical address signal received at reference numeral 1102. As part of the decoding, the column decoder 240 and the row decoder 250 identify which BL, WL, and DL lines should be actuated for access to the MTJ cell or cells.

At reference numeral 1106, the process 1100 includes destabilizing the MTJ cell or cells associated with the PUF challenge for a predetermined period of time. To destabilize the MTJ cell or cells, one or both of the drivers 242 and driver 252 supply a source current pulse of suitable magnitude and duration to take the MTJ cell or cells to their hard axis. Here, it is noted that the step of destabilizing at reference numeral 1106 does not occur during normal read and write operations of the memory array 210, as the write and read portions of the timing diagram in FIG. 12 show. Thus, it should be appreciated that the memory device 200 is configured to perform the destabilizing, releasing, and reading at reference numerals 1104, 1106, and 1108 in response to the logical authentication enable signal received at reference numeral 1102.

In various embodiments, the destabilizing at reference numeral 1102 can be achieved through a current generated magnetic field or current induced STT, as described herein. For a current generated magnetic field, the DL driver 252 sources a current pulse of magnitude $I_D$ for duration $\tau_D$. The values of $I_D$ and $\tau_D$ may vary depending upon various factors, such as the temperature of the memory array 210, the sizing of the MTJ cells, the thicknesses of one or more of the free, tunneling barrier, or fixed layers of the MTJ cells, or other physical or operating characteristics of the memory array 210. Generally, the value of $I_D$ may be selected so as to ensure that the MTJ cells are is taken to a hard axis or maximum energy state, as described above with reference to FIG. 5, for example. One example of values of $I_D$ and $\tau_D$ is provided above in Table 3. Table 3 also includes an example value for current induced STT. With reference to FIG. 12, destabilizing the MTJ cell or cells associated with the PUF challenge for a predetermined period of time $\tau_D$ is shown at reference number 1206.

Referring again to FIG. 11, at reference numeral 1108, the process 1100 includes releasing the one or more MTJ cells associated with the PUF challenge. For example, the releasing includes the DL driver 252 releasing the current pulse of magnitude $I_D$. At reference numeral 1110, the process 1100 includes reading the settling state of the one or more MTJ cells. For example, for each of the MTJ cells, a current is passed through the MTJ cell, and the sense amplifiers 230 sense a differential voltage across the MTJ cell. The differential voltage is representative of the magnetoresistance of the MTJ cell after destabilizing and settling. As described herein, the settling state magnetoresistance of an MTJ cell is relied upon for determining a unique response to the authentication challenge received at reference numeral 1102. To the extent that multiple MTJ cells are accessed during an authentication challenge, the readings from the individual cells may be concatenated, aggregated, or assembled together in any suitable form as a single response to the authentication challenge.

According to one aspect of the embodiments, the reading at reference numeral 1110 occurs at a predetermined time $\tau_x$ after the releasing at reference numeral 1108, as noted at reference numeral 1208 in FIG. 12. The value of $\tau_x$ may vary depending upon various factors, such as the temperature of the memory array 210, the sizing of the MTJ cells, the thickness of one or more of the free, tunneling barrier, or fixed layers of the MTJ cells, or other physical or operating characteristics of the memory array 210. However, the value of $\tau_x$ is generally independent of how the MTJ cells associated with the PUF challenge were destabilized.

At reference numeral 1112, the process 1100 includes encrypting the settling state values of the one or more MTJ cells read at reference numeral 1110. For example, the encrypter 280 is configured to encrypt the settling state values received from the MTJ cells, however aggregated or assembled together, and encrypt the values into an encrypted response result. In some embodiments, the encrypting at reference numeral 1112 may be omitted from the process 1100.

At reference numeral 1114, the process 1100 includes providing a value representative of the settling state values of the MTJ cells read at reference numeral 1110 as a response to the authentication challenge received at reference numeral 1102. In embodiments where the settling state values are encrypted, the value provided at reference numeral 1114 may be encrypted. At this point, consistent with the description provided above with reference to FIG. 1, an authenticating system can compare the response to the authentication challenge with an expected response, to authenticate the memory device 200 or any other suitable purpose.

Although the flowchart or process diagram in FIG. 11 illustrates a specific order, it is noted that the order can differ from that which is depicted. For example, an order of execution of two or more blocks can be scrambled relative to the order shown. Also, two or more blocks shown in succession in FIG. 11 can be executed concurrently or with partial concurrence. Further, in some embodiments, one or more of the blocks shown in FIG. 11 can be skipped or omitted.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

At least the following is claimed:

1. A method of using a magnetic tunnel junction (MTJ) cell as a physically unclonable function (PUF), comprising:
    destabilizing the MTJ cell through application of a first current pulse on a digitline of the MTJ cell for a first predetermined period of time to orient the MTJ cell to a hard axis of an energy profile of the MTJ cell;
    releasing the MTJ cell from the destabilizing for a second predetermined period of time to allow the MTJ cell to reach a settling state;
    reading the settling state of the MTJ cell through application of a second current pulse on a bitline of the MTJ cell; and
    providing a value representative of the settling state as a response of the PUF.

2. The method of claim 1, further comprising:
    receiving a logical address signal associated with a PUF challenge;
    based on the logical address signal, decoding a location of the MTJ cell in an array of MTJ cells;
    receiving a logical authentication enable signal; and
    performing the destabilizing, releasing, and reading in response to the logical authentication enable signal.

3. The method of claim 2, wherein the decoding comprises decoding at least a bitline and a wordline of the MTJ cell to access the MTJ cell in the array of MTJ cells based on the logical address signal.

4. The method of claim 1, wherein the destabilizing comprises applying a magnetic field to the MTJ cell to orient the MTJ cell to the hard axis of an energy profile of the MTJ cell.

5. The method of claim 1, wherein the destabilizing comprises destabilizing the MTJ cell using a current pulse of predetermined magnitude and for the first predetermined period of time.

6. The method of claim 1, wherein the reading comprises sensing a differential voltage across the MTJ cell at a predetermined period of time after the releasing to allow the MTJ cell to settle to the settling state.

7. The method of claim 6, wherein providing the value representative of the settling state comprises at least one of encoding or encrypting a value representative of the differential voltage as the value representative of the settling state.

8. The method of claim 1, wherein the MTJ cell comprises a plurality of MTJ cells, and providing a value representative of the settling state comprises providing a value representative of settling states of each of the plurality of MTJ cells.

9. A memory device including a physically unclonable function (PUF), comprising:
    a memory array, the memory array including a magnetic tunnel junction (MTJ) cell selected for use as a PUF;
    an address decoder configured to access the MTJ cell in the memory array based on a logical address signal associated with the MTJ cell; and
    driver circuitry configured, in response to a logical authentication enable signal, to:
        destabilize the MTJ cell through application of a first current pulse on a digitline of the MTJ cell for a first predetermined period of time to orient the MTJ cell to a hard axis of an energy profile of the MTJ cell;

release the MTJ cell for a second predetermined period of time to allow the MTJ cell to reach a settling state of the MTJ cell;

read the settling state of the MTJ cell through application of a second current pulse on a bitline of the MTJ cell; and provide, over a data bus, a value representative of the settling state as a response of the PUF.

10. The memory device of claim 9, wherein, to destabilize the MTJ cell, the driver circuitry is configured to apply a magnetic field to the MTJ cell to orient the MTJ cell to the hard axis of an energy profile of the MTJ cell.

11. The memory device of claim 9, wherein, to destabilize the MTJ cell, the driver circuitry is configured to apply a current pulse of predetermined magnitude and for the first predetermined period of time.

12. The memory device of claim 9, wherein, to read the settling state of the MTJ cell, the driver circuitry is configured to sense a differential voltage across the MTJ cell at a predetermined period of time after the release, to allow the MTJ cell to settle to a settling state.

13. The memory device of claim 9, wherein the MTJ cell comprises a plurality of MTJ cells, and the driver circuitry is configured to provide the value representative of the settling state based on settling states of each of the plurality of MTJ cells.

14. A method of using a magnetic memory cell as a physically unclonable function (PUF), comprising:

destabilizing the magnetic memory cell through application of a first current pulse on a digitline of the magnetic memory cell for a first predetermined period of time to orient the magnetic memory cell to a hard axis of an energy profile of the magnetic memory cell;

releasing the magnetic memory cell from the destabilizing for a second predetermined period of time to allow the magnetic memory cell to reach a settling state of the magnetic memory cell;

reading the settling state of the magnetic memory cell through application of a second current pulse on a bitline of the magnetic memory cell after the releasing; and providing a value representative of the settling state as a response of the PUF.

15. The method of claim 14, further comprising:

receiving a logical address signal associated with a PUF challenge;

based on the logical address signal, decoding a location of the magnetic memory cell in an array of magnetic memory cells;

receiving a logical authentication enable signal; and performing the destabilizing, releasing, and reading in response to the logical authentication enable signal.

16. The method of claim 15, wherein the decoding comprises decoding at least the bitline and a wordline of the magnetic memory cell to access the magnetic memory cell in the array of magnetic memory cells based on the logical address signal.

17. The method of claim 14, wherein the destabilizing comprises applying a magnetic field to the magnetic memory cell to orient the magnetic memory cell to the hard axis of the energy profile of the magnetic memory cell.

18. The method of claim 14, wherein the destabilizing comprises destabilizing the magnetic memory cell using a current pulse of predetermined magnitude and for the first predetermined period of time through at least one of a bitline, a wordline, or a digitline associated with the magnetic memory cell.

19. The method of claim 14, wherein the reading comprises sensing a differential voltage across the magnetic memory cell after the releasing, to allow the magnetic memory cell to settle to a settling state.

20. The method of claim 19, wherein providing the value representative of the settling state comprises at least one of encoding or encrypting a value representative of the differential voltage as the value representative of the settling state.

* * * * *